2,985,647
Patented May 23, 1961

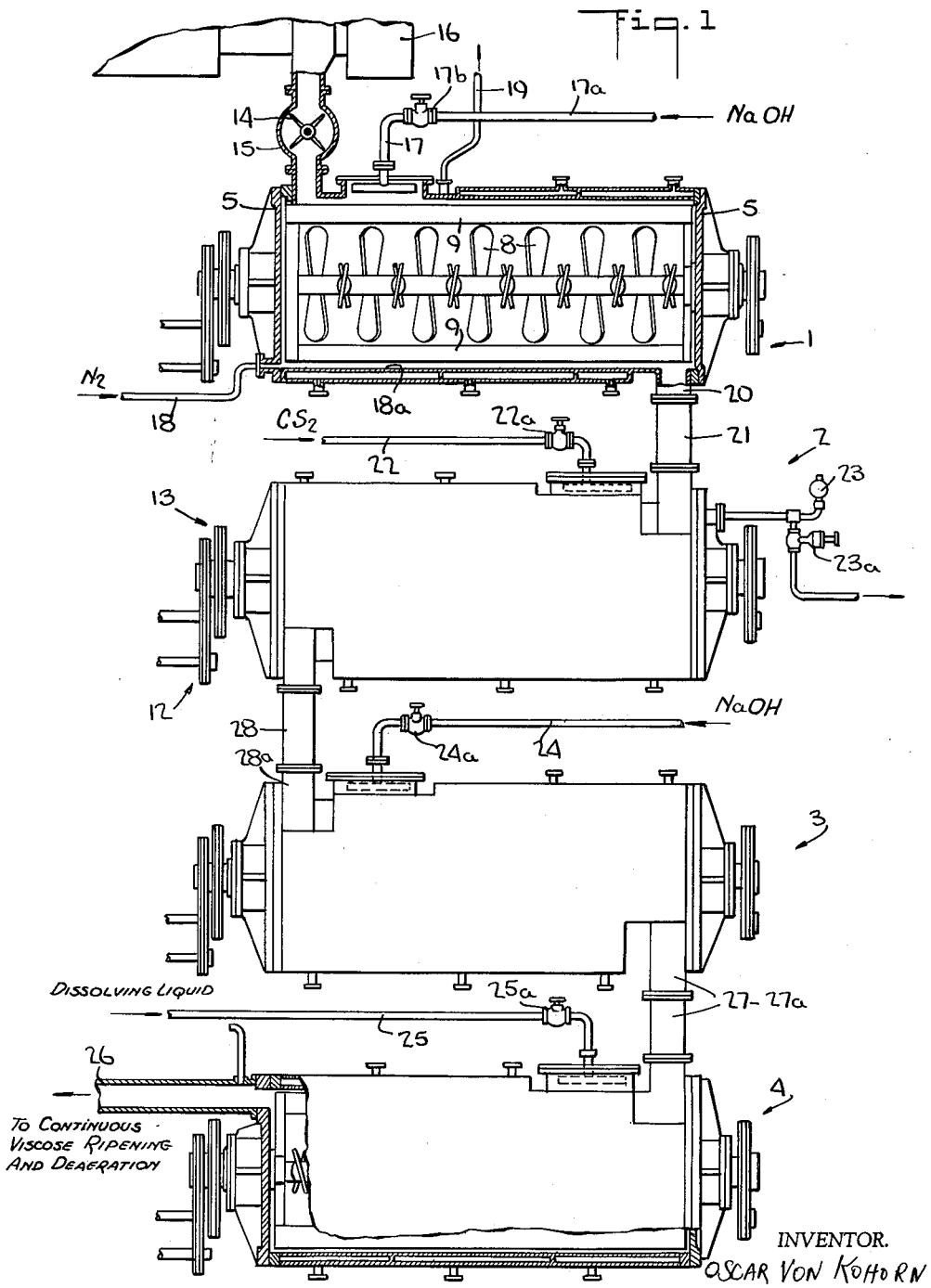

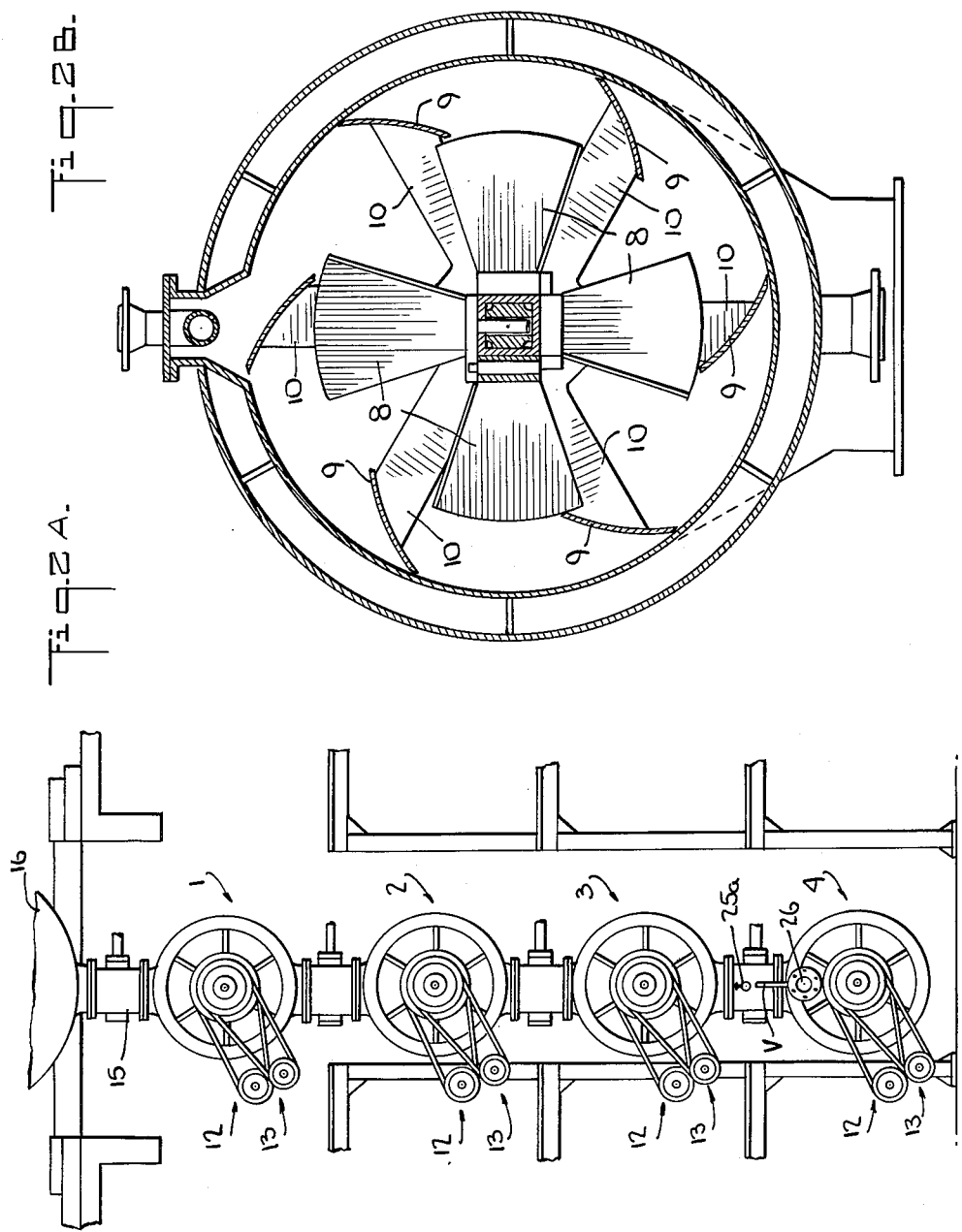

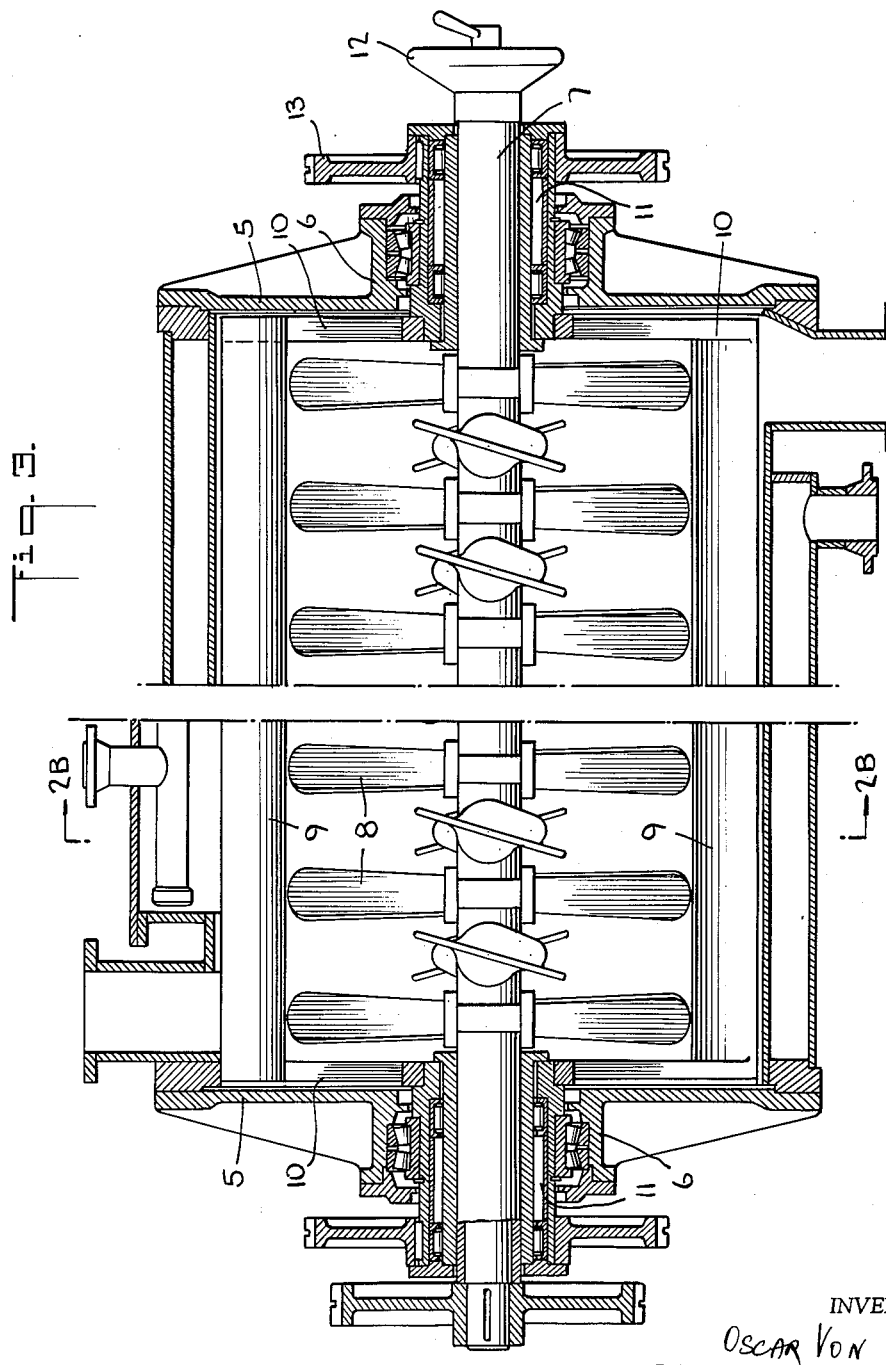

2,985,647
MANUFACTURE OF VISCOSE SPINNING SOLUTION

Oscar Von Kohorn, 912 5th Ave., New York, N.Y.

Filed Jan. 12, 1959, Ser. No. 786,123

8 Claims. (Cl. 260—217)

My invention relates to a new and improved method and new and improved apparatus for the manufacture of a spinning solution of viscose rayon, from alkalized cellulose, such as the well-known aged alkali-cellulose crumbs or shreds.

Heretofore, the manufacture of viscose rayon has usually been done commercially by a batch process. This batch process is well known and described, for example, in a textbook entitled "Handbook of Plastics" by Simonds & Ellis, published in 1943 by D. Van Nostrand Co., Inc.; in another textbook entitled "The New Fibers" by Sherman and Sherman, published in 1946 by D. Van Nostrand Co., Inc.; and in "Industrial Chemistry of Colloidal and Amorphous Materials" by Lewis et al., published in 1942 by the MacMillan Company.

In general, the old batch method of making viscose rayon which has been used commercially for many years is summarized as follows:

The starting material may be a high-grade wood pulp, or cotton linters, or a mixture of these materials. This starting material is purified cellulose, which is high in alpha-cellulose, which is insoluble in 17.5% aqueous sodium hydroxide solution at 20° C.

In the first step, which is generally designated as the "steeping" step, the starting material in sheet form is immersed in an aqueous 18–19% by weight sodium hydroxide solution during a reaction period of thirty minutes to ninety minutes, at a reaction temperature of substantially 18° C. This results in a reaction between the cellulose and the dissolved sodium hydroxide. This reaction results in sheets of alkali cellulose. The excess of caustic liquor is then removed, and the sheets of alkali cellulose are pressed until their final pressed weight is approximately three times their original weight. The chemical reaction which results in the alkali cellulose is completed or substantially or largely completed in this step.

The reaction product is designated as "alkali cellulose" or as "sodium alkali cellulose."

After completing said pressing operation of said first step, the pressed sheets of alkali cellulose are immediately transferred in the old process to powerful shredders, where said sheets are milled and disintegrated into a fluffy condition. This step is designated as a "shredding" step. The temperature of this shredding step is controlled between 20° C.–30° C., since the pulp is alkalized and the oxygen in the air reacts to some extent with the cellulose during this shredding step, thus decreasing the length of the cellulose molecular chains.

In the third step, the crumbs of fluffy alkali cellulose are placed in cans and stored at a temperature of about 25° C.–30° C., during a storage period or ageing period of approximately forty-eight hours. During this ageing period, the chemical reaction between the alkali-cellulose and the oxygen continues, and the chain length of the cellulose molecule is further decreased. This ageing step is an important step, because the chain length of the cellulose molecule controls the viscosity of the final viscose spinning solution, and this viscosity controls the ultimate strength of the regenerated cellulose fiber which results from the viscose process.

At the end of this ageing period, the aged sodium alkali cellulose crumbs are transferred to revolving drums or barrattes, to which carbon bisulfide is added. This step is known as the xanthation step. Prior to adding the carbon bisulfide, the barratte or drum is evacuated, in order to remove substantially all of its air and in order to vaporize the carbon-bisulfide before it reacts with the alkali-cellulose. The crumbs or shreds of alkali cellulose have at least 15% by weight of sodium hydroxide. These crumbs are not easily wetted by liquid carbon bisulfide, so that, in the old process, vaporized carbon bisulfide is used to wet those crumbs or shreds. This reaction between the vaporized carbon bisulfide and the aged sodium alkali cellulose crumbs forms a thio-carbonate of cellulose. The xanthation step requires about two hours at a temperature of 25° C.–30° C. As a result of this xanthation step, the fibrous alkali-cellulose is changed to masses which are granular and soft, with a bright orange color. The xanthation step is exothermic, so that the barrattes are equipped with cooling devices for controlling the temperature.

Also, means are provided for removing from this equipment the gases which are formed during xanthation reaction and any excess carbon bisulfide.

The cellulose xanthate is now soluble in dilute aqueous caustic soda solution and, in the next step of the old process, the cellulose xanthate is transferred to dissolvers, which are provided with water jackets, in which the cellulose xanthate is mixed with a dilute aqueous solution of caustic soda, in a mixing and dissolving step. During this mixing and dissolving step, the temperature is maintained at about 17° C. The resultant solution has an orange color and is known as "viscose." This viscose has a cellulose content of approximately 6%–9% and a sodium hydroxide content of 4%–8% by weight.

In the next step of the old process, the viscose solution is transferred to large blending or storage tanks where individual batches of viscose solution are mixed, in an attempt to provide a uniform viscose solution which has uniform properties. The viscose solution is filtered several times to remove undissolved particles and foreign matter, and the mixed viscose solution is allowed to ripen for a period which is usually 48 hours, at a temperature of 18° C.–22° C. During this ripening step, there is some hydrolysis of the cellulose xanthate. The ripened viscose solution is used as the viscose spinning solution, after it has been evacuated, that is, freed from air. After having reached the desired degree of ripeness, the viscose solution is pumped to the spinning machine. The operation of the spinning, whereby the viscose spinning solution is extruded through spinnerets into an acid bath, is to regenerate the cellulose in the form of filaments from the viscose spinning solution.

In recent years, some of the operational steps of the aforementioned batch process have successfully been modified and changed into a continuous operation by using machines and apparatus specially designed for the purpose. This refers especially to the preparation of aged alkali-cellulose and the preparation of viscose from cellulose xanthate. So far, an entirely continuous practical and economical process for the manufacture of viscose spinning solution from cellulose material, comprising the operational steps of steeping cellulose, shredding and ageing alkali-cellulose, xanthating this aged alkali-cellulose, dissolving the xanthate into viscose solution, mixing, filtering and ageing the viscose solution, could not be developed. The most important step in the whole manufacturing process, namely, the xanthation of aged alkali-cellulose, has offered too many problems, mechanically as well as chemically. Therefore, the xanthating process has up to now been the missing link in the whole continuous practical and economical manufacturing process of preparing a viscose solution ready to be spun.

According to this invention, I utilize the continuously performed steps of alkalizing the cellulose, pressing the alkali-cellulose to remove surplus sodium hydroxide solution, shredding and ageing the pressed alkali-cellulose to produce shreds or crumbs of aged alkali-cellulose.

Heretofore, in the well-known commercial process, the steps of xanthation and then dissolving the cellulose xanthate in a dilute solution of sodium hydroxide have required a batch operation, thus preventing a completely continuous process of producing viscose. One reason has been that it has been so far considered necessary to react the alkali-cellulose with carbon bisulfide in vapor form, and the commercial process has been a batch-type operation which has been performed in a previously evacuated barratte or revolving drum or kneader.

It has been suggested to design machinery for continuous xanthation of alkali-cellulose by means of vaporized carbon bisulfide, as in U.S. Patent No. 2,122,519. It has also been attempted to react the alkali-cellulose with liquid carbon bisulfide, in which case the weight of the carbon bisulfide used in the reaction has been at least four times to ten times the weight of the alkali-cellulose, in order to obtain a suitable slurry, and the removal of the excess of carbon bisulfide has been an additional operation. Such use of liquid carbon bisulfide is disclosed in U.S. Patent No. 2,364,392. If the carbon bisulfide is used in vaporized form, the weight of the carbon bisulfide is about 10 percent to 15 percent of the weight of the alkali-cellulose.

I have discovered that said aged alkali-cellulose crumbs or shreds can be effectively reacted with 10% to 15% of its weight of liquid carbon bisulfide, if said crumbs or shreds have less than 15 percent by weight of sodium hydroxide, so that I eliminate the use of vaporized carbon bisulfide.

According to one embodiment of my invention, I mix the usual aged alkali-cellulose crumbs or shreds with a suitably dilute aqueous solution of sodium hydroxide, in a first diluting step, to make a first mixture in which said crumbs or shreds have a lowered content of sodium hydroxide which is less than 15 percent by weight. I then mix this first mixture with liquid carbon bisulfide to make a second mixture in which the liquid carbon bisulfide effectively wets said crumbs or shreds. Preferably, the xanthation reaction is not completed in said second mixture. Prior to the completing of the xanthation reaction in said second mixture, I mix said second mixture with a suitably dilute aqueous solution of sodium hydroxide to make a third mixture, in which the xanthation reaction is completed. For convenience, the step of mixing the aged alkali-cellulose crumbs or shreds with a suitably dilute aqueous solution of sodium hydroxide, prior to adding the liquid carbon bisulfide, is designated as the first dilution step. If additional, suitably dilute aqueous solution of sodium hydroxide is added prior to the completion of the xanthation reaction, this is conveniently designated as the second dilution step.

The alkali-cellulose crumbs or shreds are effectively swelled as a result of the first dilution step, thus facilitating the xanthation reaction. The cellulose xanthate which is produced in the second mixture is effectively swelled as a result of the second dilution step, thus facilitating the completion of the xanthation reaction in said third mixture.

As a result of this first diluting step, I can lower the content of sodium hydroxide in said aged alkali-cellulose crumbs or shreds to 10%–14% by weight, preferably to 11%–12.5% by weight. Excessive dilution of the alkali content of the alkali-cellulose is avoided as one important factor, in order to eliminate excessive hydrolysis of the alkali-cellulose and of the cellulose xanthate. It is also important to maintain suitable temperatures during this part of the process. Suitable temperatures during the first diluting step and the first xanthating step are 26° C.–36° C. Preferably, the temperature during the first stage of xanthation is 29° C.–33° C. During the second diluting step, in which the xanthation is completed, the temperature is 24° C.–32° C., with a preferred range of 24° C.–29° C. During this second diluting step, the xanthation is completed simultaneously with the primary dissolving step.

This dissolving step is subsequently completed by mixing the viscose mass with well cooled water or preferably with a well-cooled dilute aqueous solution of sodium hydroxide, and results in a good commercial viscose solution.

Under these conditions, it is practical to xanthate the pre-aged alkali-cellulose crumbs or shreds with normal amounts of carbon bisulfide in liquid form. Also, since the xanthation and the dissolving of the cellulose xanthate take place simultaneously to a considerable degree, the improved equipment described herein can be used for continuously processing the well-known pre-aged alkali-cellulose crumbs or shreds into cellulose xanthate and into viscose spinning solution. The viscose spinning solution which is thus prepared according to my improved process can be continuously filtered, ripened and deaerated to be ready for spinning.

The apparatus described herein, which uses a series of interconnected reaction zones or reaction vessels, is continuously supplied with the previously-mentioned aged or depolymerized alkali-cellulose shreds or crumbs, as starting material. This starting material can be made in usual equipment. The ageing or depolymerization of the alkali-cellulose shreds or crumbs may be in a continuous preliminary process which is continuous with the new process and equipment described herein.

The invention is further described in the annexed diagrammatic drawings and in the following description:

Fig. 1 is an elevation which shows four reaction zones which may be horizontally arranged one above the other, or which may be arranged one after the other in a straight horizontal line.

Fig. 2A is an end view of Fig. 1.

Fig. 2B is a cross-section of one of the tanks of Fig. 1.

Fig. 3 is a longitudinal section of one of said tanks.

In this embodiment there are four reaction vessels or tanks in a set, respectively numbered "1," "2," "3," and "4," but the number of such reaction tanks per set may be varied. These vessels 1, 2, 3, 4 have respective longitudinal and horizontal axes. These longitudinal axes are in the same vertical plane in this embodiment. These tanks 1, 2, 3, 4 are made of metal or any suitable inert material. These tanks may be identical. Each of said tanks 1, 2, 3 and 4 has an air-tight cover 5 at each end thereof. Each cover 5 is integral with a bearing 6 which turnably supports a double-acting, agitating and transporting device, which includes a horizontal and longitudinal shaft 7 to which a plurality of paddles 8 are fixed. Each of these paddles 8 has a straight and laterally disposed paddle-axis which is perpendicular to the longitudinal horizontal axis of the shaft 7. Each paddle 8 is angularly adjustable around its respective paddle-axis, relative to the axis of the shaft 7. The planes of the paddles 8 are maintained parallel to each other. The angle of the paddles 8 relative to the axis of shaft 7, controls the speed at which the mass in the respective tank is longitudinally transported from the inlet end of the respective tank to the outlet end thereof, and thus controls the period during which each mass is subjected in the respective tank to the respective reaction.

In addition, this double-acting, agitating and transporting device has longitudinal blades 9. Each blade 9 is fixed to spokes 10 of a respective hollow shaft 11, which is provided at each end of each tank 1, 2, 3, 4. Each hollow shaft 11 is rotatable relative to the respective shaft 7, which acts as a bearing for the respective hollow shaft 11. The bearings 6 provide additional bearings for said hollow shafts 11.

The shaft 7 of each tank 1, 2, 3, 4 and its respective paddles 8 are rotated in unison, by means of a conventional drive 12, and each hollow shaft 11 is rotated in unison with its blades 9, by means of a conventional drive 13. The blades 9 act as thorough mixers of the reaction mass in the respective tank.

The first reaction tank or reaction zone 1 is used to wet and to dilute or lower the content of sodium hydroxide in the pre-aged alkali-cellulose crumbs or shreds, by means of an aqueous solution of sodium hydroxide. A rotating vane feeder 14 continuously feeds the predetermined amount of the pre-aged alkali-cellulose crumbs or shreds through the inlet hopper 15, into the first-stage tank 1, at the inlet end of said tank 1. It is unnecessary specifically to illustrate the anterior apparatus 16 for supplying the well-known pre-aged alkali-cellulose shreds or crumbs. It is sufficient to note that this anterior apparatus 16 may consist of several containers or tanks of the design illustrated herein.

An aqueous solution of sodium hydroxide is simultaneously introduced close to the inlet end of first-stage tank 1, through a series of nozzles 17. These nozzles 17 are supplied with the aqueous solution of sodium hydroxide through a supply pipe 17a which has an adjustable control valve 17b. The pre-aged, alkali-cellulose crumbs or shreds are thoroughly and uniformly wetted at the inlet end of tank 1 by the aqueous solution of sodium hydroxide which is flowed or sprayed through nozzles 17.

The first reaction tank 1 is also provided with an inlet pipe 18, through which nitrogen or other inert gas is supplied. This inlet pipe 18 is connected to an anterior perforated pipe or header 18a, in order to maintain the interior of the tank 1 filled with nitrogen, so that dangerous amounts of air cannot accumulate in the apparatus. The nitrogen is thus introduced into the tank 1, simultaneously with the feeding of the alkali-cellulose crumbs into tank 1. The vent nozzle 19 serves to discharge any excess of the air-nitrogen mixture which results from the feeding of the nitrogen into the tank 1. An atmosphere of pure nitrogen or other suitable inert gas is preferably maintained within the interior of the tank 1 at a pressure of 760 millimeters of mercury, with little or no air or oxygen. The alkali-cellulose is thoroughly mixed with the aqueous solution of the sodium hydroxide close to the inlet end of tank 1 and the liquid mixture continuously travels from the inlet end of tank 1 longitudinally towards the outlet or discharge end of first tank 1 and continuously passes out of the first tank 1 and enters the second reaction tank 2, through the outlet discharge pipe or duct 20—21.

The diluted alkali-cellulose is treated with carbon bisulfide in liquid form in the second stage tank or xanthation tank 2. This liquid carbon bisulfide is continuously supplied through pipe 22, which has a control valve 22a. A pressure gauge 23 and a pressure relief valve 23a are provided, as safety devices in case of faulty operation. This tank 2 may have an atmosphere of nitrogen which is under a pressure of 760 millimeters of mercury. This tank 2 may be wholly or substantially filled with a mixture of the material which is flowed out of tank 1 and the liquid carbon bisulfide.

The alkali-cellulose is thus continuously xanthated within the tank 2, during the period in which the material is flowed continuously from the inlet end of second tank 2, longitudinally toward and out of the outlet end of tank 2. The cellulose xanthate which is produced in the second tank 2 is continuously discharged through pipe 28—28a into the third reaction tank 3, in which the cellulose xanthate is subjected to a second diluting treatment with an aqueous solution of caustic soda. This aqueous caustic soda solution is supplied through the pipe 24, which has a control valve 24a. The xanthation reaction in tank 3 is completed simultaneously with the preliminary dissolving of the cellulose xanthate.

Finally, after continuously leaving the third reaction tank or reaction zone 3 through pipe 27—27a, the diluted cellulose xanthate enters the fourth reaction tank 4, in which the solution of the cellulose xanthate is completed by adding water or a dilute solution of sodium hydroxide. The liquid for this purpose, either water or a dilute solution of sodium hydroxide, is supplied through the pipe 25, which has a control valve 25a. The dissolved viscose solution is continuously discharged from the reaction tank 4 through the outlet nozzle 26, which has a vent V for venting gas.

There is thus a continuous longitudinal flow of material consecutively through the tanks 1, 2, 3 and 4, from the inlet end of each said tank to its outlet end, and finally out of the tank 4. The nozzle 26 is connected to the continuous equipment for ripening, filtering and de-aerating the viscose solution, to provide the final spinning solution.

The parts which move inside the tanks 1, 2, 3, 4, and the inner walls of said tanks, may be made of or covered with flameproof and sparkproof material, such as coating material of "Teflon," which is a tetrafluoroethylene polymer, which is described in page 558 of the 1953 edition of "Handbook of Material Trade Names," published by Industrial Research Service. Such covering or coating also inhibits the adhesion of cellulose material.

The invention is further illustrated by the following specific examples:

*Example No. 1*

The inlet end of first tank 1 is continuously supplied with shreds or crumbs of aged alkali-cellulose at the rate of 20 kilograms per minute. This aged alkali-cellulose may be of the previously described kind. These aged alkali-cellulose crumbs have a degree of polymerization of 340, a cellulose content of 34 percent by weight, and an alkali content of 15.8 percent by weight. These crumbs of aged alkali-cellulose are thus continuously supplied to the inlet out of tank 1 through the inlet hopper 14, at a temperature of 32° C.

In order to prevent dangerous amounts of air from entering the apparatus, the crumbs of aged alkali-cellulose are kept thoroughly flushed with nitrogen in tank 1 or prior to entering tank 1. Simultaneously with supplying the crumbs of aged alkali-cellulose to the first tank 1, said first tank 1 is continuously supplied at the rate of 12 kilograms per minute, with a 9% by weight aqueous solution of caustic soda, at a temperature of 25° C., through the pipe 17a. This concentration of the sodium hydroxide is calculated upon the weight of the solution, so that a 9% solution of caustic soda corresponds to 90 grams of caustic soda per kilogram of solution. The crumbs or shreds of aged alkali cellulose are uniformly mixed with the 9% by weight aqueous solution of sodium hydroxide, at or close to the inlet end of tank 1, to provide a liquid flowable mass. The speed of longitudinal transfer of the mass through the tank 1 is adjusted so that each part of the liquid mass is fed through tank 1 from its inlet end to its outlet end during a reaction period of twenty minutes, during which the temperature of the material in tank 1 is maintained at 29° C. The first tank 1 thus provides the first mixing and diluting zone therein, prior to xanthation in the second tank 2. The gaseous atmosphere in tank 1 consists substantially of nitrogen, which may be at a pressure of 760 millimeters of mercury, at the temperature of 29° C. which is maintained within tank 1.

While continuously leaving this first mixing and diluting tank or zone 1, and while continuously entering the second tank or zone 2, 2.6 kilograms per minute of liquid carbon bisulfide are continuously added to the material through pipe 22, at a temperature of 23° C. The reaction period in the xanthation zone in tank 2 is set at twenty minutes in this example, while the temperature of the continuously flowing material in the xanthation zone of tank 2 is allowed to rise to a controlled temperature of 32° C., which is substantially the temperature of the partially sulfidized or xanthated material which is produced within the second zone 2, during the entire period of twenty minutes treatment in second zone 2. That is each particle of the mixture within tank 2 flows from the inlet end of tank 2 to its outlet end, during a period of twenty minutes.

Upon entering the third tank or zone 3 through the pipes 28—28a, the partially sulfidized or xanthated alkali-cellulose which has been continuously produced in the xanthation zone 2 and which flows continuously out of zone 2, is intimately mixed in tank 3 with 20 kilograms per minute of a 9% by weight aqueous solution of caustic soda at 20° C. This 9% aqueous solution of caustic soda is continuously supplied to tank 3 through the pipe 24. As the material travels longitudinally through the tank 3 from its inlet end to its outlet end, the temperature of the material is gradually decreased from 32° C. to 25° C. The period of treatment in the tank or zone 3 is 25 minutes. The gaseous atmosphere in tank 3 is nitrogen which may be under a pressure of 760 millimeters of mercury. That is, the tanks 1, 2, 3, 4 may be filled completely with the flowing material, but the pressure within said tanks may be 760 millimeters of mercury.

Upon leaving the third zone 3 and entering the fourth zone 4 through the pipes 27—27a, the continuously flowing mass is mixed in said fourth zone 4 with 36 kilograms per minute of a one percent aqueous caustic soda solution at 5° C., which is supplied continuously through the pipe 25.

Each part of the continuously flowing material remains in the tank 4, which provides the second dissolving zone, for a dissolving period of 20 minutes. This tank 4 has a vent V in its outlet pipe 26 and is provided with a temperature regulation device which provides an outlet temperature of 17° C. for the viscose solution which leaves the reaction zone 4 through pipe 26 in a continuous stream at the rate of 90.6 kilograms per minute. This viscose solution contains 7.5% cellulose and 7.2% of sodium hydroxide by weight, and it has a viscosity of 45 seconds to 50 seconds, as determined by the steel ball method, in which the steel ball has a diameter of 1/8 inch, and it is allowed to fall through in said viscose solution through a height of 20 centimeters at 20° C.

*Example No. 2*

Twenty kilograms of aged alkali-cellulose crumbs per minute are continuously fed into the inlet of the first stage tank 1, at a temperature of 34° C. This starting material has, by weight, 33% of cellulose and 15% of sodium hydroxide, with a degree of polymerization of 320.

11.6 kilograms of 8% by weight caustic soda solution are continuously flowed per minute at 20° C. into the inlet of the first reaction zone or tank 1, through the pipe 17a. In this example, each part of the mixture of alkali-cellulose and of the aqueous caustic soda solution travels for a period of 18 minutes from the inlet end of the tank 1, longitudinally towards its outlet end 20—21. The flowing mixture within the first tank 1 is kept at a temperature of 27° C. This first tank 1 has a gaseous atmosphere of nitrogen, which may be under a pressure of 760 millimeters of mercury. The tanks 2, 3, 4 may have a gaseous atmosphere of nitrogen, which may be under a pressure of 760 millimeters of mercury. That is, these tanks 1, 2, 3, 4 may be kept wholly or partially filled with the flowing mixture, but their gaseous atmosphere, if any, is at a pressure of 760 millimeters of mercury.

2.4 kilograms per minute of liquid carbon bisulfide, at 22° C., are continuously fed through the pipe 22 into the inlet end of the second zone 2, which is the xanthation zone. The carbon bisulfide is not vaporized in tank 2. The mixed material within the tank 2 flows longitudinally from the inlet end of said tank 2 towards its outlet end 20—21 during a xanthation reaction period of thirty minutes, during which the temperature of the xanthated reaction material is allowed to rise to 33° C. up to the outlet end 20—21 of the tank 2.

Sixteen kilograms of a dilute aqueous solution of caustic soda are continuously fed per minute into the inlet end of the tank 3 through the pipe 24. This aqueous solution of caustic soda has 10% of sodium hydroxide by weight, and its temperature is 18° C. The period of longitudinal travel of each part of the mixture within the tank 3, from its inlet end at 28—28a to its outlet end 27—27a is a reaction period of 25 minutes, and the temperature of the moving material within tank 3 is controlled so that said temperature decreases from 33° C. at the inlet end 28—28a to 24° C. at its outlet end 27—27a.

Thirty-eight kilograms per minute of a 2% by weight aqueous solution of sodium hydroxide are continuously supplied through the pipe 25 to or very close to the inlet end of the tank 4. The temperature of this 2% by weight aqueous solution of caustic soda is 5° C. The mixed material travels continuously through the tank 4 from its inlet end 27—27a to its outlet end 26, during a reaction period of 20 minutes.

The viscose solution is thus discharged through the outlet 26 to the apparatus for ripening and deaerating said viscose solution, at the continuous rate of 88 kilograms per minute. The viscose solution is thus continuously discharged through outlet 26 at a temperature of 17° C. This viscose solution has 7.5% of cellulose by weight, 7.1% of sodium hydroxide by weight, and a viscosity of 42 to 47 seconds when measured as above stated.

*Example No. 3*

Twenty kilograms per minute of aged alkali-cellulose crumbs or shreds are continuously supplied through the inlet hopper 15 to the inlet end of the first tank 1. This alkali-cellulose has, by weight, 33% of cellulose and 15% of alkali, and it is fed into tank at a temperature of 34° C. It has a degree of polymerization of 300. The gaseous atmosphere of tanks 1, 2, 3, 4 consists substantially of nitrogen, which may be under a pressure of 760 millimeters of mercury. As in the previous examples, the tanks 1, 2, 3, 4 may be wholly filled with the flowing material.

In the first dilution zone 1, 11.6 kilograms per minute of an 8% by weight aqueous solution of caustic soda are supplied continuously through pipe 17a at an inlet temperature of 24° C.

In this example, 2.4 kilograms per minute of liquid carbon bisulfide, at 23° C., are supplied and used in liquid form through pipe 24 to the second xanthation zone 2.

Sixteen kilograms per minute of a 9% by weight caustic soda solution are supplied through pipe 24 to the third zone 3 at an inlet temperature of 18° C., and finally, 32 kilograms per minute of a 1% aqueous solution of sodium hydroxide are supplied through pipe 24 to the inlet of tank 4 at 5° C.

In the first reaction tank 1, there is a reaction period of 15 minutes, for the longitudinal movement of each part of the material within said tank 1, from its inlet end towards its outlet end.

In the second or xanthation zone 2, the reaction period is thirty minutes, which is the time required for the movement of each part of the material from the inlet 20—21, longitudinally to the outlet 28—28a. The period of longitudinal movement and reaction within the third tank 3 is 25 minutes, and there is the same period of longitudinal movement and reaction of 25 minutes in the fourth zone 4.

A temperature of 30° C. is maintained in the first tank 1, a temperature in the range of 30° C.–34° C. is maintained in the second tank 2, a temperature of 34° C.–24° C. is maintained in the third tank 3, and a temperature of 24° C.–17° C. is maintained in the fourth tank 4. Therefore, there is a drop of temperature between the inlet and outlet ends of each of the third and four tanks 3 and 4, and a rise in the second tank 2 from 30° C. to 34° C.

In this example, the discharge through the outlet 26 of tank 4 is 82 kilograms per minute of viscose solution at 17° C. This viscose solution has, by weight, 8% of cellulose and 7% of caustic soda. Its viscosity is 45 seconds to 50 seconds, when determined as above mentioned.

*Example No. 4*

Twenty kilograms per minute of aged alkali-cellulose crumbs or shreds are continuously fed through the inlet hopper 15 to the inlet end of the first tank 1. This alkali-cellulose has, by weight, 33% of cellulose and 15% of sodium hydroxide. It is supplied at an inlet temperature of 34° C. It has a degree of polymerization of 410.

The first tank 1 is supplied continuously at its inlet end with 11.6 kilograms per minute of 8% aqueous caustic soda solution by weight, at an inlet temperature of 24° C., through the pipe 17a.

The second tank 2 is supplied at its inlet end through the pipe 22, with 2.7 kilograms per minute of liquid carbon bisulfide at an inlet temperature of 24° C., through the pipe 22.

The pipe 24 is supplied per minute with 20 kilograms of a 10% by weight aqueous solution of sodium hydroxide at an inlet temperature of 18° C.

The pipe 25 is supplied per minute, with 77 kilograms of a 2.5% by weight aqueous solution of caustic soda at an inlet temperature of 4° C.

The operation is continuous as in all the preceding examples.

The period of longitudinal movement and hence the reaction period in each of the tanks 1, 2, 3 and 4 is 20 minutes. The gaseous atmosphere in said tanks is nitrogen, or substantially nitrogen, which may be at a pressure of substantially 760 millimeters of mercury.

The respective outlet temperatures in each of said four zones is 28° C. in the first tank 1, at its outlet 20—21; 34° C. in the second tank 2, at its outlet 28—28a; 26° C. at the outlet 27—27a of the third tank 3; and 16° C. at the outlet 26 of the last tank 4. The increase or decrease of temperature in the respective tank is uniform during the respective longitudinal movement.

The viscose is thus discharged in this example at the outlet 26 at the rate of 131.3 kg. per minute and has a cellulose content of 5% by weight and a sodium-hydroxide content of 6% by weight. The viscosity of this viscose solution is 54 to 61 seconds when measured as above stated.

There may be considerable variations in the above-mentioned novel method for the continuous manufacture of viscose solution.

As one example, but without limitation thereto, the shaft 7 of each tank is rotated at the rate of 4.5 revolutions per minute, and the hollow shafts 11 in each tank are rotated at the rate of 1.5 revolutions per minute. Each of the said tanks 1, 2, 3 and 4 may have an axial length of four meters, and an internal cylindrical diameter of 0.8 meter.

As is well known, the sodium salt of cellulose xanthate is water-soluble as a colloidal solution which is unstable, so that said solution slowly but progressively hydrolyzes with ultimate regeneration of the cellulose.

In the prior commercial process, one batch of spinning solution may differ from another. According to the continuous process disclosed herein, there is substantial uniformity in the continuous production of the viscose spinning solution.

Carbon bisulfide has a boiling point of 46.3° C. under normal atmospheric pressure of 760 millimeters of mercury. As above noted, the tank 2 is maintained at a temperature of 23° C.–32° C., and the pressure of the gaseous atmosphere in said tank 2 may be 760 millimeters of mercury, so that vaporization of the carbon bisulfide is prevented or substantially prevented.

In general, the starting material which I use, consists of aged alkali-cellulose crumbs or shreds, which may have a degree of polymerization on a range of substantially 300 to 410.

In the first dilution zone 1, I modify these alkali-cellulose crumbs and I produce a first mixture which is continuously moved through said first dilution zone 1. I modify these alkali cellulose crumbs in said first dilution zone by lowering their content of alkali-cellulose, so that said crumbs are easily wetted when said first mixture is mixed with liquid carbon disulfide in the first xanthation zone 2. The original aged alkali-cellulose crumbs may have substantially 15% to 15.8% by weight of sodium hydroxide. The first solution of sodium hydroxide has a lower concentration of sodium hydroxide than the crumbs which are used as starting material. This first solution of sodium hydroxide, which is used in the first dilution zone 1, may have substantially 8% to 9% of sodium hydroxide by weight.

The weight of the first aqueous solution of sodium hydroxide which is flowed into tank 1 may be substantially 55% to 60% of the weight of the aged alkali-cellulose crumbs which are fed into tank 1.

The modified alkali-cellulose crumbs which are produced in this first mixture are partially xanthated or sulfidized in the first xanthation zone 2, by using liquid carbon disulfide in unvaporized form. The weight of said carbon disulfide may be substantially 12% to 13% of the weight of the original aged alkali-cellulose crumbs and may be substantially 8% of the weight of the first mixture. The mixture which is formed in vessel 2 is conveniently designated as the second mixture.

In the third vessel 3, which is the second dilution zone, the partially xanthated second mixture is mixed with a second aqueous solution of sodium.

This second aqueous solution of sodium hydroxide may have substantially 9% to 10% by weight of sodium hydroxide. The purpose of making this third mixture, is to xanthate the alkali-cellulose completely.

In the fourth vessel or tank 1, I complete the viscose solution by adding water or preferably adding a dilute solution of sodium hydroxide.

In some respects, the invention is not limited to a continuous method.

The invention is further disclosed in the appended claims.

I claim:

1. A method of making cellulose xanthate, which consists in mixing crumbs of aged alkali-cellulose with from 10% to 15% of their weight of liquid carbon bisulfide, at 26° C. to 36° C., said crumbs having substantially 10% to 14% of sodium hydroxide by weight.

2. In a method of making cellulose xanthate from aged crumbs of alkali-cellulose as starting material, said crumbs having at least substantially 15% of sodium hydroxide by weight, the improvement which consists in lowering said percentage of sodium hydroxide to substantially 10% to 14% of sodium hydroxide by weight by mixing said crumbs with an aqueous solution of sodium hydroxide which has less than 14% of sodium hydroxide by weight to make a first mixture at substantially 26° C. to 36° C., and then mixing said first mixture with liquid carbon bisulfide in the amount of from 10% to 15% of the weight of the crumbs to make a second mixture at substantially 26° C. to 36° C. in which the xanthation reaction is at least partially performed.

3. A method according to claim 2 in which the percentage of sodium hydroxide in said crumbs is lowered to substantially 11% to 12.5% by weight.

4. A method according to claim 3 in which the second mixture is made and maintained at substantially 24° C. to 32° C.

5. A method of making a spinning solution of cellulose xanthate from starting material which consists of aged crumbs of alkali-cellulose which has at least substantially 15% of sodium hydroxide by weight, comprising the steps of mixing said crumbs in a first diluting step with a first aqueous solution of sodium hydroxide which has less than 15% of sodium hydroxide by weight, to produce a first mixture which has crumbs of aged alkali-cellulose which have substantially 10% to 14% of sodium hydroxide by weight, at substantially 26° C. to 36° C.; mixing said first mixture with liquid carbon bisulfide in the amount of from 10% to 15% by weight of the crumbs, at substantially 26° C. to 36° C. to make a second mixture which has sufficient liquid carbon bisulfide to xanthate said crumbs of said first mixture, and partially completing the xanthation reaction in said second mixture; mixing said second mixture with a second aqueous solution of sodium hydroxide which has less than 14% by weight sodium hydroxide to make a third mixture at substantially 29° C. to 33° C., and completing the xanthation reaction in said third mixture, the content of sodium hydroxide in said crumbs being maintained at substantially 10% to 14% by weight during the entire xanthation reaction.

6. A continuous method according to claim 5, in which said starting material is fed continuously into a first diluting zone, said first aqueous solution is fed continuously into said first diluting zone to make said first mixture, and said first mixture is flowed continuously within said first diluting zone out of its outlet; said first mixture is flowed continuously into a first xanthating zone into which the liquid carbon bisulfide is fed continuously to make said second mixture, said second mixture is flowed continuously out of said first xanthating zone to a second diluting zone to which said second aqueous solution is fed continuously; and the second aqueous solution is fed continuously to said second diluting zone to make said third mixture, and said third mixture is flowed continuously out of said second diluting zone.

7. A continuous method according to claim 6 in which said third mixture is flowed continuously into a dissolving zone into which an aqueous solvent of cellulose xanthate is fed continuously in order to dissolve the cellulose xanthate, the temperature of the dissolving zone being maintained at from 24° C. to 36° C.

8. A continuous method of making a viscose solution from aged alkali-cellulose crumbs, said crumbs having an alkali content of substantially 15% by weight, which consists in feeding said crumbs substantially continuously into the inlet end of a first zone, also substantially continuously feeding a first aqueous solution of sodium hydroxide into the inlet end of said first zone and substantially continuously mixing said infed crumbs with said infed aqueous solution to make a first mixture in said first zone and substantially continuously feeding said first mixture through said first zone to its outlet end and out of said outlet end into the inlet end of a second zone, making said first mixture at substantially 26° C.–36° C., feeding said first aqueous solution into said first zone at a rate to lower the alkali content of said crumbs in said first mixture to a range of substantially 10%–14% by weight; feeding liquid carbon bisulfide into said inlet zone substantially continuously and at a rate which corresponds to substantially 10% to 15% of the weight of said crumbs, substantially continuously mixing said first mixture with the said infed carbon bisulfide in liquid form in said second zone to make a second mixture at substantially 26° C.–36° C., substantially continuously flowing said second mixture through said second zone to and through its outlet end into the inlet end of a third zone, only partially xanthating said crumbs in said second zone; substantially continuously feeding a second aqueous solution of sodium hydroxide into the inlet end of said third zone and substantially continuously mixing said second mixture with said second aqueous solution in said third zone to make a third mixture at from 29° C. to 33° C., the xanthation reaction being substantially completed in said third mixture while substantially continuously feeding said third mixture through and out of said third zone, and dissolving the viscose which is formed by the substantial completion of said xanthation reaction.

References Cited in the file of this patent
UNITED STATES PATENTS

| | | |
|---|---|---|
| 1,942,346 | Scheller | Jan. 2, 1934 |
| 1,957,707 | Glauser | May 8, 1934 |
| 2,057,019 | Evans | Oct. 13, 1936 |
| 2,068,631 | Richter | Jan. 19, 1937 |
| 2,112,576 | Richter | Mar. 29, 1938 |
| 2,139,302 | de Booys | Dec. 6, 1938 |
| 2,810,658 | Pontium | Oct. 22, 1957 |
| 2,845,416 | Elling | July 29, 1958 |